May 10, 1960 — F. J. NIEMI — 2,936,365
ELECTRIC WELDING DEVICE
Filed Feb. 26, 1958
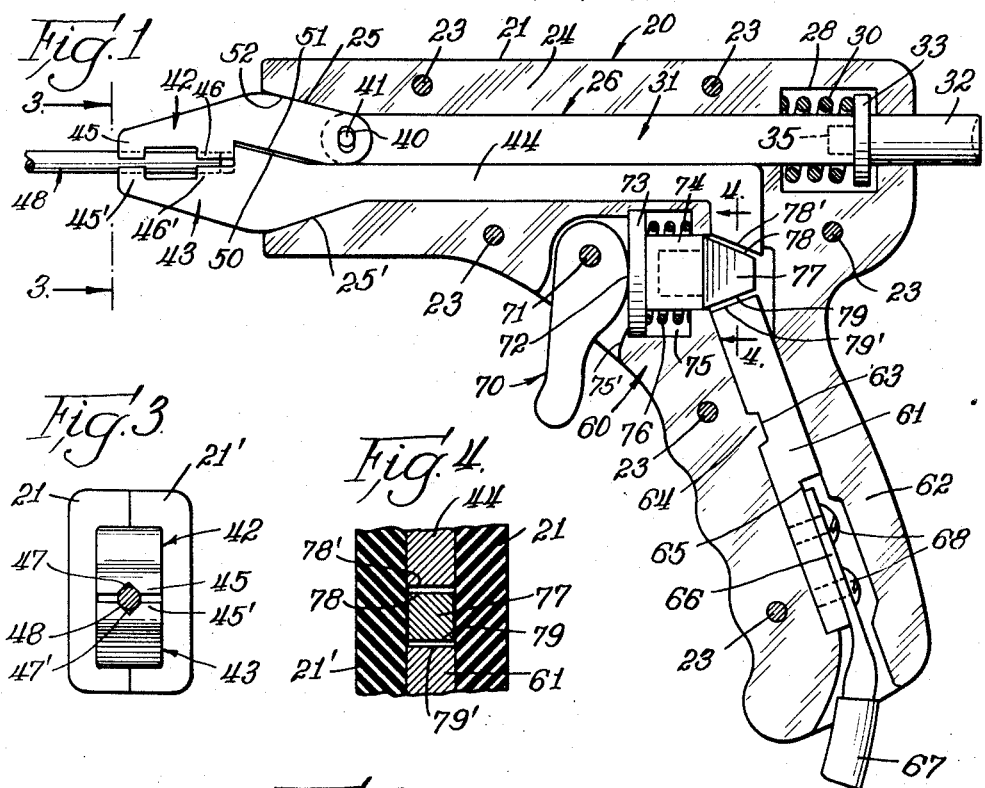
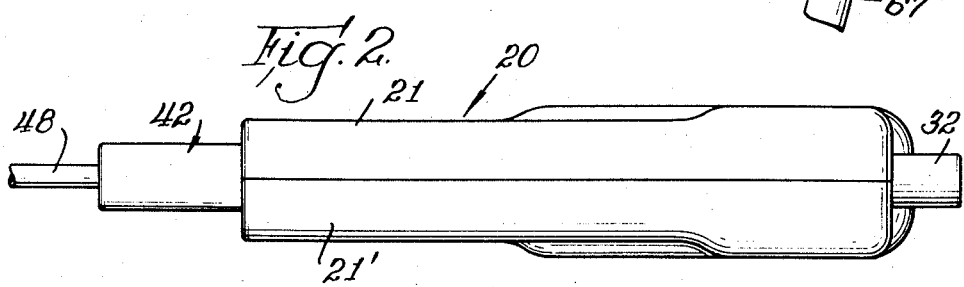
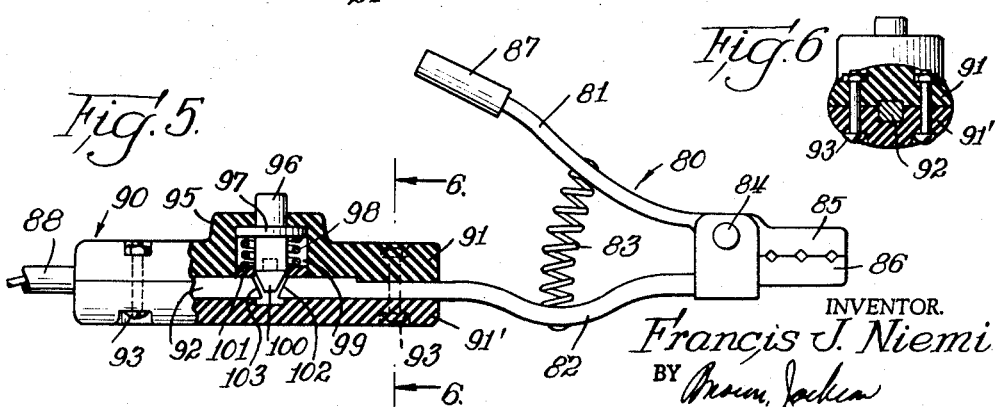
INVENTOR.
Francis J. Niemi
BY
Att'ys

United States Patent Office 2,936,365
Patented May 10, 1960

2,936,365

ELECTRIC WELDING DEVICE

Francis J. Niemi, Gurnee, Ill.

Application February 26, 1958, Serial No. 717,689

4 Claims. (Cl. 219—138)

This invention relates, in general, to electric welding and more particularly to improved means for holding an electrode welding rod for electric arc welding.

According to present practice, electrode holders used in electric arc welding comprise substantially large alligator-type clamps having an insulated holding handle and a spring loaded jaw; the insulated handle carrying a current of 250 to 300 amperes with circuit being established to ground through an electrode welding rod held by the spring loaded jaws of the holder. While the handles of such alligator-type holders are insulated so that the operator may safely grip the same in use, the remainder of the device is highly conductive and will immediately establish a circuit to ground when brought into contact with a grounded conductor, such as the item being worked on, scaffolding, tool benches, and like items. Further, the accepted operation of an electric welding machine is such that to deenergize the electrode holder, requires a complete shutdown of the machine which is usually some distance away from the welding scene at the end of an operating cable. Thus, the operator, when equipped with the normal electrode holder for electric arc welding, according to present practice, is faced with the difficulty of handling a dangerous conductive instrumentality which is subject to short-circuiting or establishing a circuit with another conductor at contact. An operator working in tight quarters inside a tank, for example, must be very careful not to brush the electrode holder against the grounded surroundings, as the same will cause arcing and sparking which is not only undesirable, but may be dangerous. If the operator wishes to deenergize the holder so that he may safely move the same or place the same in a resting condition after the completion of a welding operation, as above mentioned, he must deenergize the arc welding generator, or place the electrode holder on a good insulator to assure that unwanted grounded connection or energization of the same will not take place. In addition to the above mentioned difficulty of accidentally establishing circuit through present electrode holders is the additional difficulty of welding manipulation. This is due to the fact that such clamp holders grip the welding rod or electrode in such a manner that the rod is disposed substantially at right angles to the longitudinal axis of the clamp. Since the operator's hand is in line with the clamp handle and such handle in line with the clamp, the electrode rod is disposed generally at right angles to the operator's hand. Some electrode holders are modified to dispose the electrode at a slight angle; but, in most instances, accepted practice for electric arc welding is as above described, with the electrode at right angles to the clamp holder. Manipulation of the electrode in such a condition is unnatural and more difficult than if the same were aligned substantially axially or in line with the operator's hand or index finger, for example, as in pointing at an object.

In order to avoid the above-outlined shortcomings of present day arc welding equipment, I have devised a new and improved electrode holder which accomplishes several desirable objects and substantially avoids both accidental arcing or grounding of the electrode and electrode holder and, additionally, presents a more convenient operative position for the electrode rod. In brief, one basic form of my invention contemplates the provision of a normally open switch at the electrode holder. The operator, by depressing a button or like switch operating means, establishes circuit to the welding electrode at his convenience. Upon release of the switch operating means, the holder and the welding electrode are deenergized. Such form of the invention is intended as a modification of presently known alligator-type electrode holders or clamps for rendering the same operative, in accordance with the features and principles of this invention. In another form of my invention, a pistol-like insulated holder is provided which includes, in addition to a trigger operated switch mechanism for energizing and deenergizing a welding electrode, as desired, an improved chuck-type clamping arrangement for gripping the welding electrodes and aligning the same substantially axially of the operator's arm. Thus, he may manipulate the electrode during the welding operation by merely pointing the same as one would aim a pistol or like device.

The main object of this invention is to provide an improved holder for use in holding electric welding rod electrode which embodies means for energizing and deenergizing the holder and associated welding electrode locally at the electrode holder.

Another object of this invention is to provide an improved electrode holder, as aforesaid, which provides improved factors of safety in operation.

An additional object of this invention is to provide a new and improved holder for supporting an electric arc welding electrode having an improved means for engaging and holding the welding electrode.

A still further object of this invention is to provide a new and improved electrode holder embodying switch means for energizing and deenergizing the holder and the electrode at the control of the operator.

Another important object of this invention is to provide a new and improved device for holding a welding rod electrode as used in electric arc welding which is simple in its construction and manufacture and provides improved features of operation and safety.

The above and further objects, features, and advantages of this invention will appear to those familiar with the art from the following detailed description of the features of the invention as illustrated in the embodiments of the accompanying drawings.

In the drawings:

Figure 1 is a side elevational view with parts thereof in section and with one half of the two-part housing removed to show the features of an improved welding gun or electrode holder of this invention;

Figure 2 is a top plan view of the holder set out in Figure 1, illustrating the housing assembly including the cover portion thereof;

Figure 3 is a cross-sectional view taken substantially at vantage line 3—3 of Figure 1;

Figure 4 is an enlarged partial cross-sectional view taken at line 4—4 of Figure 1;

Figure 5 is a side elevational view with portions thereof shown in cross section illustrating a modified form of the invention adapted for the conversion of the normally employed alligator-type clamp or electrode holder; and Figure 6 is an enlarged cross-sectional view taken at line 6—6 of Figure 5 and looking in the direction of the arrows thereon.

Turning now to the features and aspects of the preferred form of the invention shown in Figure 1, the same comprises a two-part body or housing 20 formed as a pistol-shaped assembly split down its longitudinal center line with one half of such body being removed in the illustration of Figure 1. The interfitting relationship of the two housing portions 21, 21' of the body assembly 20 will better be understood by examining Figure 2, for example. The two body portions 21, 21' are identical and each constitutes a one-half shell for assembly 20; such two half portions being held together by a plurality of holding bolts or like connection devices 23 extending therebetween. Since the two portions 21, 21' are identical, a description of the one will suffice for both, it being recognized that the chambering attributed to the one is duplicated in the other, thus to form full chamber areas for housing suitable mechanisms as will be described presently.

The gun-like housing 20 is formed with a barrel portion 24 having a throat opening formed by inclined walls 25, 25' at the muzzle end of a central bore 26. An enlarged chamber section 28 is provided near the breech end of the barrel portion, which acts in conjunction with the other half shell 21' as a cylindrical breech chamber for housing a compression spring 30 mounted around a jaw actuator 31 slidably disposed in bore 26. The jaw actuator 31 is manually operated from the breech end of the gun barrel portion 24 by means of a manually engageable operator portion 32 formed coaxially with an enlarged spring engaging flange 33 at its inner end and which is housed within chamber 28.

The manually engageable operator projection 32 is preferably made of insulating material or covered with a suitable insulated coating to isolate the operator from electrical currents and energy carried by the jaw actuator 31. As shown in Figure 1, such manually engageable portion 32 is preferably independent of the operator 31 and joined to the base end of the latter as by threaded screw means 35. The opposite end of the operator member 31 bears a slotted opening 40 receptive of a pivot pin 41 which tranverses the longitudinal axis of the operator member and pivotally connects a movable gripping jaw member 42 to the operator.

The jaw member 42 cooperates with a corresponding fixed jaw member 43 stationed therebelow and integrally formed with stationary conductor bar 44 which contacts and lies alongside of the operator 31. The bar 44 fits into a suitable indented recess formed in the body portion 21 and comprising the lower half of the central axial bore opening 26.

Jaws 42 and 43 are suitably formed with axially spaced gripping portions 45, 46 and 45', 46', respectively, having triangular recesses 47, 47' forming a socket for locating, engaging and gripping an electrode welding rod 48 or the like thrust thereinto. It will be recognized further that the jaw members are substantially rectangular in cross section, as viewed in Figure 3, and that the same are interfittingly arranged with a sloping cam portion 50 projecting outwardly of the upper face on the lower stationary jaw member and mating with a corresponding recess 51 formed in the adjacent face of the upper jaw member 42. With this arrangement, as jaw 42 slides over the fixed jaw member 43, the inclined wedge or cam 50 causes jaw 42 to move upwardly as its sloping face 51 rides therealong. This activity results in pivoting and parallel translating motion for member 42, the latter due to the presence of the slotted opening 40 at pivot 41. This parallel translation of jaw 42 permits accommodation of various welding rod diameters. Of course, reverse movement of the operator 31 to the right (as seen in Figure 2) causes the jaws to close as the sloping cam face 25 at the throat opening rides against the opposed sloping wall 52 of the movable jaw member.

As explained, pushing the manually engageable means 32 forwardly permits jaw member 42 to move upwardly, so that an electrode rod 48 may then be inserted into a substantially cylindrical socket provided by recesses 47, 47' of the spaced jaw gripping portions 45, 45' and 46, 46'. This action also compresses the return spring means 30 in the cylindrical socket or chamber 28 at the rear of the gun so that upon release of the thrust applied to means 32, rearward sliding or return activity of the actuator bar 31 occurs to close the upper jaw 42 and clamp the electrode rod 48 tightly in place.

In addition to the electrode gripping mechanism, as hereinabove described, the improved electrode holder 20 of this invention also includes a novel control means for energizing the electrode rod 48. This means is indicated generally by numeral 60 in Figure 1 and constitutes a switch mechanism manually operable to close circuit between the fixed or stationary bar member 44, associated with the lower electrode gripping jaw member 43 and a terminal connector bar 61 disposed within the interior of a handle portion 62.

Connector bar 61 may be, as shown, substantially square in formation and disposed in a centrally formed hollow chamber of the handle portion 62; the same being locked in position between the two housing halves 21 and 21' and maintained against axial displacement by virtue of a key indentation 63 formed in the conductor 61 which cooperates with a projection 64 molded integrally with the handle portion 62 to invade the chamber in which the conductor 61 resides.

The outermost end of the conductor 61 is cut away to provide a flattened platform area 65 to which the terminal connector 66 of a supply conductor cable 67 is attached as by connective screw means 68, 68'. It will be understood in this regard that, with the two housing portions 21, 21' assembled with their adjacent faces abutting, the connection between the supply cable and the conductor 61 is entirely isolated and insulated from the operator by virtue of the surrounding handle portion 62.

Turning now to the switch assembly 60, the same includes an insulated trigger actuator 70 available to the operator's forefinger, much as the trigger of a pistol. Such trigger 70 is pivoted on pin 71 which extends between the housing half portions 21, 21'. A cam portion 72 is formed eccentrically of pivot pin 71 at the inner end of the trigger to engage a flange 73 of an insulated actuating plunger 74 movable in a cylindrical socket 75 which communicates with a trigger chamber 75'.

Flange 73 is adapted to engage one end of a compression spring 76 disposed in socket 75 and surrounding the plunger 74. While the trigger 70 and the plunger member 74 are preferably both made of insulating material, an electrically conductive contact plug 77 is threaded into the innermost end of the operating plunger 74, the same bearing a substantially square cross-sectional configuration, as viewed in Figure 4. Contact member 77 particularly includes a pair of converging sloping faces 78 and 79 which engage correspondingly parallel opposing end wall faces 78' and 79' related to the stationary bar member 44 and the conductor bar 61, respectively.

In operation, movement of the trigger member 70 in a counterclockwise motion about its pivotal axis 71 serves through its eccentric or cam portion 72, to move the plunger operator 74 to the right, as viewed in Figure 1, thereby compressing spring 76 and moving the attached contact member 77 into circuit closing contact with the sloping faces 78' and 79'. Therefore, so long as the trigger member 70 is held depressed by the operator, circuit is established between the cable 67 and the jaws 42 and 43 which hold and grip the welding electrode 48. Conversely, release of the trigger member permits the return spring 76 to return the trigger to a non-operating position and to withdraw the contact 77 from its engaging relation with the adjacent ends of the two conductive members 44 and 61, thereby interrupting the circuit to the electrode. Additionally, the planar faces 78 and 79 on the contact member 77 and the corresponding and parallel disposed faces 78' and 79' provide a desirably large contact area between the contact member 77 and conductive members 44 and 61.

With reference now to Figures 5 and 6 of the drawings, I have therein illustrated a modified assembly which is particularly adapted and directed to revision of presently known equipment, according to the concepts of my above-described device, and particularly to features of the switch operation. To this end, a conventional electrode gripping device or holder, indicated generally by numeral 80, is shown as including a movable arm member 81 which is spring biased away from a stationary handle arm 82 by an intervening spring means 83; said movable arm being pivotal about a pin 84 and including at its outer end electrode gripping jaw means 85 which cooperates with a corresponding stationary jaw member 86 related to handle arm 82. The free end of the operating handle member 81 is equipped with an insulating cover member 87 to permit safe depression thereof against spring 83 in separating the jaws 85 and 86.

The stationary handle member 82 normally is connected directly to the supply conductor 88 and includes an insulating grip portion for manual engagement by the operator. Such grip portion may comprise a plastic or other insulator, as desired.

According to the modification of this conventional type equipment to embody the features of my invention, as set out in Figure 5 in particular, a manually engageable handle assembly 90 is provided; the same constituting a pair of substantially identical half members 91 and 91', defining therebetween a centrally disposed substantially square-shaped axial chamber for socketing a terminal conductor means 92 and one end of the handle arm 82. Suitable bolts 93, or the like, are used to hold the two half members in assembled relationship, as shown. The upper member 91 is suitably provided intermediate its ends with a raised platform or boss portion 95 which bears a central opening for the passage of an insulating operating plunger 96 having an enlarged flange portion 97 intermediate its ends. Such flange portion 97 engages the upper end of a compression spring means 98 disposed in a cylindrical chamber 99 within boss 95 and which communicates with the hollow interior of the handle. The lower end of the plunger 96 is equipped with an electrically conductive insert member 100 having a wedge-shaped cross section and planar contact faces, substantially as with contact member 77, previously described. Member 100 is adapted to enter a wedge-shaped opening between the opposed ends of the stationary handle arm 82 and the terminal connector 92; a supply cable 88 having suitable circuit connection with the latter within handle 90. The lower end of return spring 98 rests on a washer 101 located at the bottom end of chamber 99 to isolate the same from conductors 82 and 92. Inclined contact faces 102 and 103 are provided on the members 82 and 92, respectively; the latter being disposed in intersecting relationship for wedging engagement with the contact member 100, substantially in accordance with the operation of contact 77 in the previously described switch assembly 60.

By depressing the operating button 96, such serves to bring the contact member 100 thereof in shunt bridging relationship between the gap faces 102 and 103 of the two members 82 and 92, respectively, thereby establishing circuit to the welding rod held in jaws 85 and 86. By releasing the plunger 96, circuit to the electrode rod is disrupted to deenergize the holder locally, at the operator's discretion. Thus, the important objective of the invention, permitting local operator control over energization of the electrode rod, is accomplished with the modified structure of Figures 5 and 6.

While I have hereinabove described the features and concepts of my invention as they relate to a preferred and modified form thereof, it will be understood that numerous changes, modifications, and substitutions of equivalents may be carried out therein without necessarily departing from the spirit and scope of my invention. As a consequence, it is not my intention that I be limited to the particulars of the structures herein described and shown in the accompanying drawings except as may appear in the following appended claims.

I claim:

1. An electrode holder for use in electric welding, comprising, a pistol-like housing having a handle portion and a barrel portion disposed substantially transversely to said handle portion, gripping jaw means comprising one stationary and one movable jaw member at the muzzle end of said barrel portion, and means for selectively operating said jaw means by translating said movable jaw member substantially parallel to and toward and away from said stationary jaw member to engage and discharge a welding rod electrode.

2. A device for holding a welding rod for use in electric arc welding and the like, comprising, a pistol-shaped housing of insulated material, said housing having a manually engageable handle and a barrel portion disposed substantially at right angles thereto, and jaw means at the muzzle end of said barrel portion for clamping an electrode rod coaxially of its longitudinal axis and said barrel portion, said jaw means comprising a stationary and movable jaw member associated in such a manner that said movable jaw member moves longitudinally and transversely of the barrel portion and said stationary jaw member in the operation of said jaw means.

3. In a device for holding a welding rod in electric arc welding comprising, means for clamping the welding rod coaxially of its longitudinal axis comprising a fixed jaw member, a movable jaw member adjacent said fixed jaw member, actuating means connected to said movable jaw member for slidingly actuating the latter in superposed parallelism to said fixed jaw member, cam means for normally biasing said movable jaw member away from said fixed jaw member in response to sliding movement thereof in one direction, and a housing for said actuating means and jaw members including a converging throat portion receptive of said jaw members, said movable jaw member having an inclined cam face matingly engaging an opposing inclined wall of said converging throat portion so that as the same is slidingly actuated in a second direction it is translated bodily toward said fixed jaw member by engagement of its said cam face with said inclined wall of said throat portion.

4. A device for holding a welding rod constituting an electrode in electric arc welding, comprising a housing having a barrel portion and a manual grip portion extending outwardly of one side of said barrel portion, a hollow chamber within said barrel portion terminating in a diverging throat portion at the muzzle end thereof, a pair of jaw members mounted at the muzzle end of said chamber and having inclined wall portions matingly engageable with opposing walls of said throat portion, one of said jaw members being movable and the other thereof being fixed, actuating rod means carrying said movable jaw member at its one end and rectilinearly movable in said chamber, manually engageable means at the breech end of said barrel portion for operating said rod means, spring means normally biasing said rod means in a direction appropriate to urge said movable jaw member in contacting engagement with said throat portion, connective means joining said movable jaw member to said operating rod means in a manner providing for translating movement thereof substantially transverse and parallel to the longitudinal axis of said rod means, and cam means for translating said movable jaw means toward and away from said fixed jaw means in response to rectilinear movement of said rod means, movement of said operating rod means in one direction serving to cause said jaw means to open for the reception of a welding rod therebetween and to close upon reverse movement of said rod means.

(References on following page)

References Cited in the file of this patent

UNITED STATES PATENTS

| | | |
|---|---|---|
| 1,589,977 | Lucas | June 22, 1926 |
| 1,729,059 | Bicsey | Sept. 24, 1929 |
| 1,883,807 | McIntire | Oct. 18, 1932 |
| 1,895,573 | Kiser | Jan. 31, 1933 |
| 2,148,095 | Yettner | Feb. 21, 1939 |
| 2,150,464 | Smith | Mar. 14, 1939 |
| 2,236,849 | Hackmeyer | Apr. 1, 1941 |
| 2,312,763 | Linquist | Mar. 2, 1943 |
| 2,458,723 | Nilsson | Jan. 11, 1949 |
| 2,538,245 | Hiller | Jan. 16, 1951 |
| 2,797,307 | Goodwin | June 25, 1957 |